(12) United States Patent  
Stiglitz

(10) Patent No.: US 8,504,914 B1  
(45) Date of Patent: Aug. 6, 2013

(54) DYNAMIC PREVIEWING OF GRAPHICS OBJECTS

(75) Inventor: Benjamin Stiglitz, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 12/854,872

(22) Filed: Aug. 11, 2010

(51) Int. Cl.  
*G06F 17/00* (2006.01)

(52) U.S. Cl.  
USPC .......................... 715/255; 715/200; 715/229

(58) Field of Classification Search  
USPC ................. 714/19; 707/683–684; 715/211, 715/200, 229, 255  
See application file for complete search history.

(56) References Cited

U.S. PATENT DOCUMENTS

| | | | | |
|---|---|---|---|---|
| 5,307,452 A | * | 4/1994 | Hahn et al. | 345/592 |
| 5,481,710 A | * | 1/1996 | Keane et al. | 719/320 |
| 7,827,483 B2 | * | 11/2010 | Unbedacht et al. | 715/256 |
| 8,127,278 B2 | * | 2/2012 | Bohle | 717/134 |
| 2002/0107886 A1 | * | 8/2002 | Gentner et al. | 707/511 |
| 2003/0120690 A1 | * | 6/2003 | Schaeffer et al. | 707/500 |
| 2003/0194148 A1 | * | 10/2003 | Haeberli | 382/283 |
| 2004/0068678 A1 | * | 4/2004 | Li | 714/38 |
| 2004/0139401 A1 | * | 7/2004 | Unbedacht et al. | 715/526 |
| 2006/0085486 A1 | * | 4/2006 | Thanu et al. | 707/200 |
| 2008/0109717 A1 | * | 5/2008 | Krauter | 715/255 |
| 2008/0177800 A1 | * | 7/2008 | Arkhipov et al. | 707/201 |
| 2008/0239329 A1 | * | 10/2008 | Kitada et al. | 358/1.1 |
| 2009/0125129 A1 | * | 5/2009 | Eldridge et al. | 715/854 |
| 2009/0201310 A1 | * | 8/2009 | Weiss | 345/594 |
| 2011/0167353 A1 | * | 7/2011 | Grosz et al. | 715/738 |
| 2012/0167104 A1 | * | 6/2012 | Bohle | 718/102 |

FOREIGN PATENT DOCUMENTS

JP          07295978 A    * 11/1995

* cited by examiner

*Primary Examiner* — Chau Nguyen  
(74) *Attorney, Agent, or Firm* — Fletcher Yoder PC

(57) ABSTRACT

A method is provided for maintaining one or more operations to restore an original state of a document in an undo stack. The document may include a graphics object. The method may further provide for receiving a selection for an operation to be performed on the graphics object and utilizing the undo stack to modify the original state of the document based on the operation to create a first preview. The first preview may be displayed in a display area of a display device before the operation is committed.

24 Claims, 9 Drawing Sheets

DYNAMIC PREVIEWING OF GRAPHICS OBJECTS

FIELD OF INVENTION

The present invention relates generally to the field of graphics editing and, in particular, to the field of dynamic previewing of graphics objects in a graphics editing application.

BACKGROUND OF INVENTION

Current graphics editing applications have tools to allow a user to draw a graphics object, such as a circle or square, and perform various operations on the graphics objects (e.g., change color or line width) using the tools. To preview an operation to be performed on the graphics object in a drawing canvas of the graphics editing application, a user must commit the operation on the graphics object to determine if it is acceptable. For example, if a user is considering changing the color of a circle from red to blue, the user must actually change the color of the circle from red to blue on the drawing canvas of the graphics editing application. However, if the user does not like the change made, the user must undo the operation manually by going through an undo operation in the graphics editing application.

SUMMARY OF THE INVENTION

Accordingly, the present invention is directed to dynamic previewing of graphics objects that substantially obviates one or more problems due to limitations and disadvantages of the related art.

In an embodiment, the present invention provides a method for maintaining one or more operations to restore an original state of a document in an undo stack. The document may include a graphics object. The method may further provide for receiving a selection for an operation to be performed on the graphics object and utilizing the undo stack to modify the original state of the document based on the operation to create a first preview. The first preview may be displayed in a display area of a display device before the operation is committed.

In another embodiment, a system comprises one or more processors, memory, a display device in communication with the one or more processors, and a preview manager and an undo manager including an undo stack stored in the memory. The preview manager may be configured to receive a selection of an operation to be performed on a graphics object in an original state. The undo manager, which may be in communication with the preview manager, may be configured to utilize the undo stack to modify the original state of the graphics object based on the operation to create a first preview. The display device may be configured to display the first preview before the operation is committed.

In another embodiment, a computer-readable storage medium stores one or more programs configured for execution by a computer, the one or more programs having instructions to maintain one or more operations to restore an original state of a document in an undo stack. The document may have a graphics object. The one or more programs may have further instructions to receive a selection for a first operation to be performed on the graphics object, utilize the undo stack to modify the original state of the document based on the first operation to create a first preview, and display the first preview before the first operation is committed.

In yet another embodiment, the present invention provides a method for maintaining an original state of a graphics object, utilizing an undo stack to modify the original state of the graphics object based on an operation, and creating a preview of the graphics object before the operation is committed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
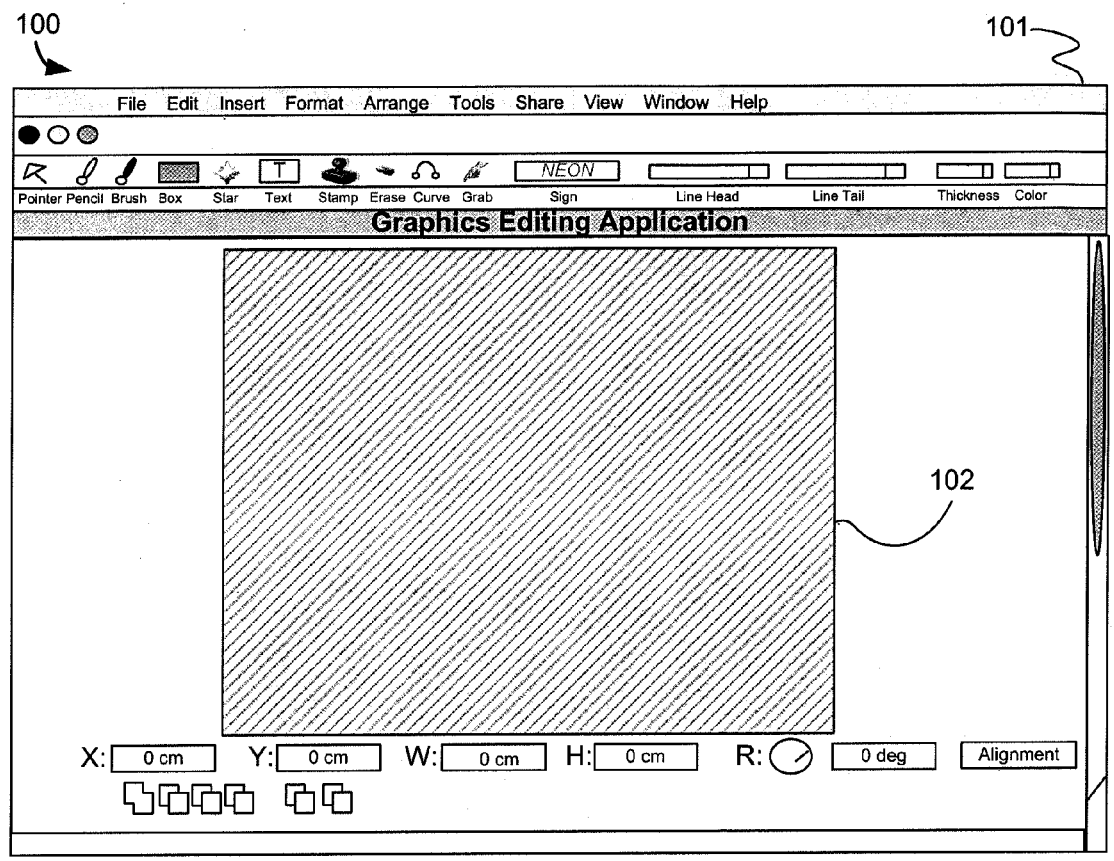
FIGS. 1-4 illustrate exemplary embodiments of a graphics editing application in accordance with the present invention.

FIG. 1 illustrates an exemplary embodiment 100 of a graphics editing application 101 in accordance with the present invention. In the exemplary embodiment 100, a user may activate the graphics editing application 101 to draw, edit, manipulate, and view various graphics, including shapes, such as lines, squares, circles, etc., and text, each separately or in combinations. In exemplary embodiment 100, a user may activate the graphics editing application 101 to draw, manipulate, edit, and view various graphics in a display area 102 (i.e., a drawing canvas).

Figure 2:
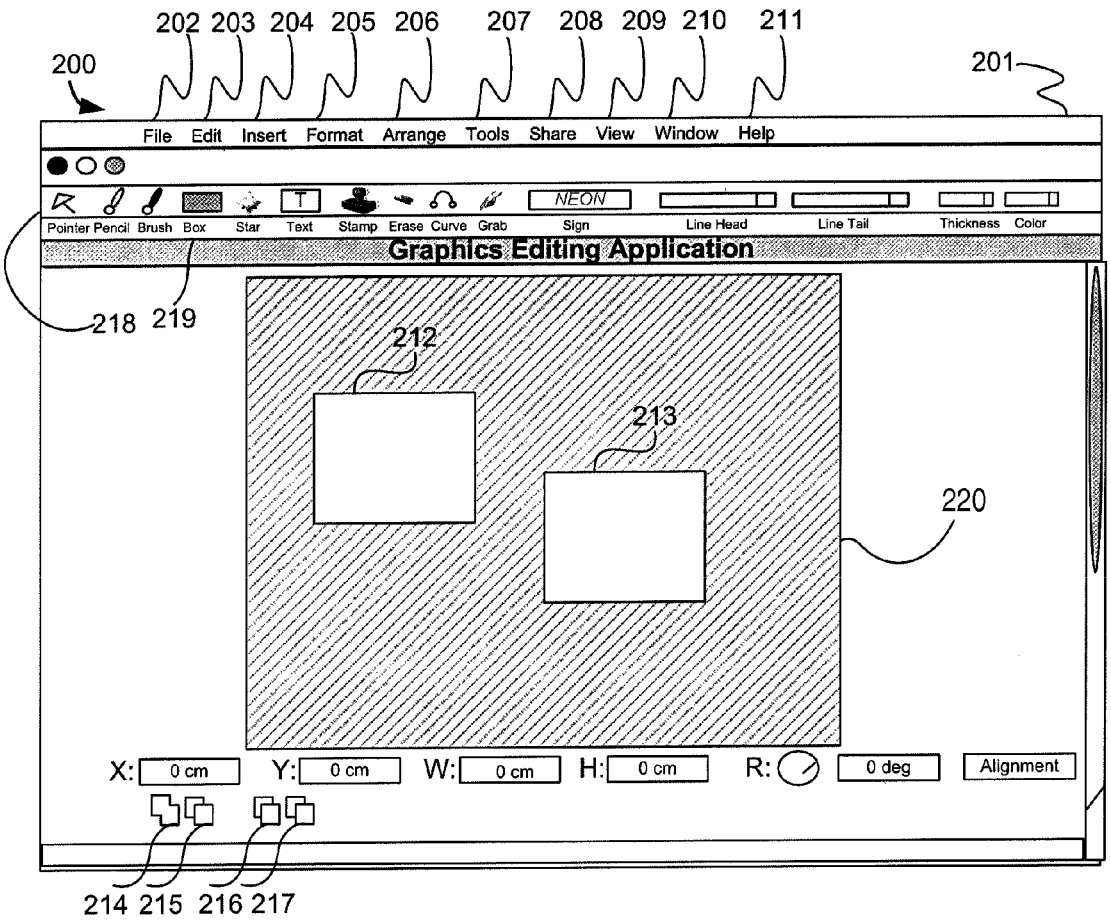

FIG. 2 illustrates an exemplary embodiment 200 of a graphics editing application 201 in accordance with the present invention. The graphics editing application 201 may include several menu features such as, for example, file 202, edit 203, insert 204, format 205, arrange 206, tools 207, share 208, view 209, window 210, and help 211. Each of these menu features 202-211 may further include additional features or options for creating, editing, and/or manipulating a graphics presentation through the graphics editing application 201. Each of the menu features 202-211, as well as any additional features or options, may have one or more corresponding modules/engines for implementing the execution of the invoked menu feature or option by sending instructions to one or more computer processors for execution.

In exemplary embodiment 200, the graphics editing application 201 may also include several icon shortcuts to menu features or options (e.g., see icon shortcuts 214-219 and icon shortcut 219 in toolbar 218). The icon shortcuts may have one or more corresponding modules/engines for implementing the execution of the invoked menu feature or option corresponding to the icon shortcut by sending instructions to one or more computer processors for execution. Icon shortcut 219 may be selected by a user to draw a square or a rectangle, such as rectangles 212 and 213, in display area 220. Other graphics objects may also be drawn using other shortcut icons (not shown), such as circles, triangles, lines, etc. Icon shortcuts 214-217 may be used to manipulate multiple graphics objects to perform operations on those graphics objects. For example, rectangle 212 may be moved to the front of or to the back of graphics objects, such as rectangle 213 using icon shortcuts 214-217. Rectangle 212 may be moved forward or backward in relation to rectangle 213 using icon shortcuts 214-217. In addition, other operations may be performed on the graphics objects, such as creating an intersection of the objects, uniting the objects, subtracting portions of the objects, excluding portions of the objects, etc.

Figure 3:
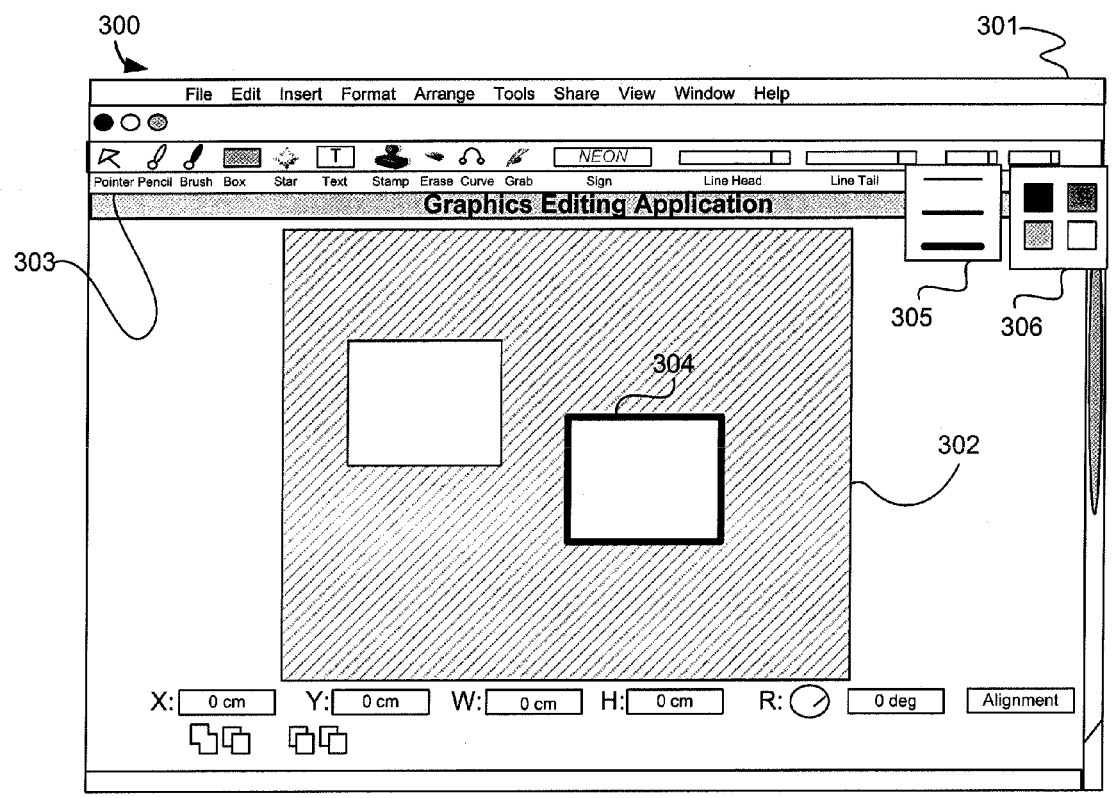

FIG. 3 illustrates an exemplary embodiment 300 of a graphics editing application 301 in accordance with the present invention. Graphics editing application may display icon shortcuts 303 and 305-306. Icon shortcut "Pointer" 303 may be used to select graphics objects, such as rectangle 304, in display area 302. Icon shortcut "Thickness" 305 may be used to perform an operation to change the thickness of the lines of a graphics object, such as rectangle 304, in display area 302. Icon shortcut "Color" 306 may be used to perform an operation to change the color of a graphics object, such as rectangle 304, in display area 302.

In exemplary embodiment 300, a user may select icon shortcut "Thickness" 305 or icon shortcut "Color" 306 to change the thickness or colors of rectangle 304. A user may hover using a mouse or other input device over each line thickness or color. In exemplary embodiment 300, a preview of the change to the thickness of the lines or color of rectangle 304 may be displayed in display area 302 while the user is hovering over the thickness of the lines or color and before the particular operation (i.e., change to thickness or color) is applied. Any operation that a user chooses to perform on a graphics object in display area 302, for example any operation, effect, or style (e.g., changes to strokes, changes to end points on lines, zooming, reordering (z-order) objects, rotating objects) available through a menu, a button, or a shortcut icon of graphics application 301, may be displayed as a preview of the operation before the operation is applied.

Figure 4:
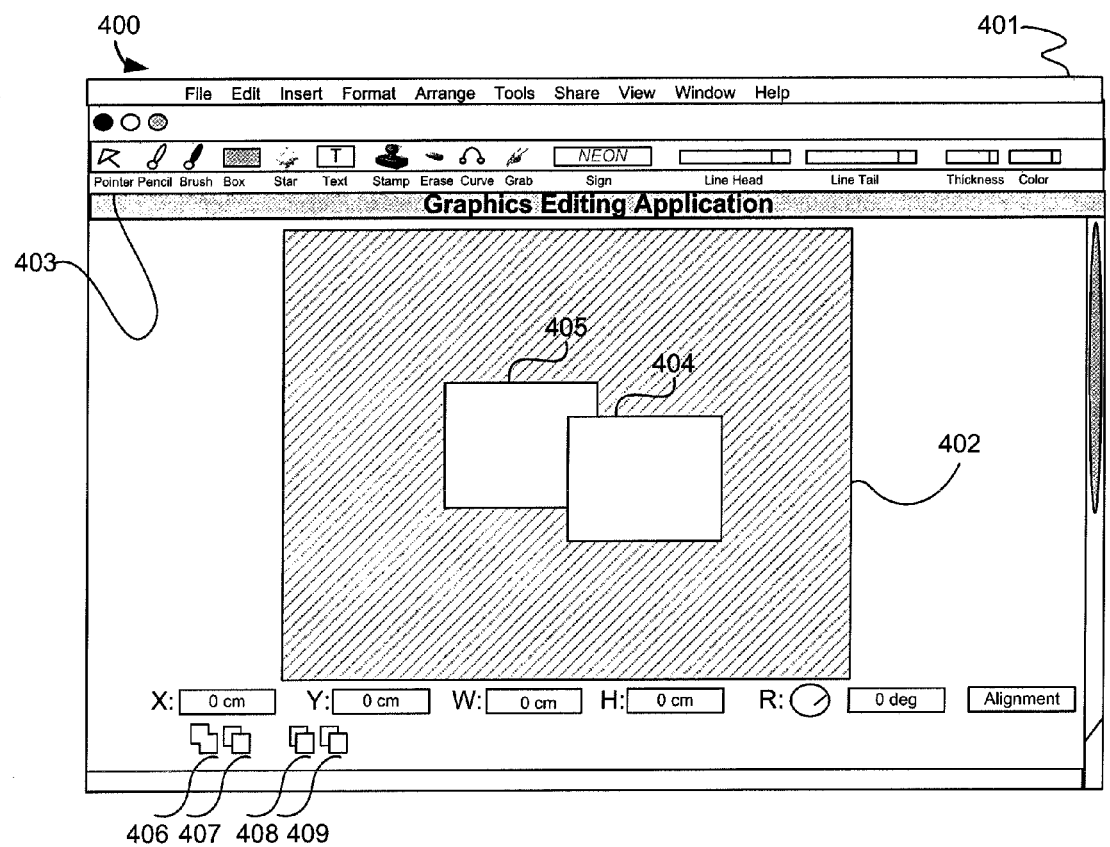

FIG. 4 illustrates an exemplary embodiment 400 of a graphics editing application 401 in accordance with the present invention. Graphics editing application may display icon shortcuts 403 and 406-409. Icon shortcut "Pointer" 403 may be used to select graphics objects, such as rectangles 404 and 405, in display area 402. Icon shortcuts 406-409 may be used to perform operations on graphics objects, such as rectangles 404 and 405. For example, the operations may include reordering objects, such as moving rectangle 404 in front of rectangle 405, moving rectangle 404 behind rectangle 405, creating an intersection of rectangles 404-405, uniting rectangles 404-405, subtracting portions of rectangles 404-405, excluding portions of rectangles 404-405, etc.

In exemplary embodiment 400, a user may select icon shortcuts for reordering objects through shortcut icons 406-409 to change the order of rectangles 404-405. A user may hover using a mouse or other input device over each shortcut icons 406-409. In exemplary embodiment 400, a preview of the reordering of the rectangles 404-405 may be displayed in display area 402 while the user is hovering over the shortcut icons 406-409 and before the particular operation (i.e., reordering) is applied. Any operation that a user chooses to perform on a graphics object in display area 402, for example any operation, effect, or style to be performed on multiple graphics objects available through a menu, a button, or a shortcut icon of graphics application 401, may be displayed as a preview of the operation before the operation is applied.

In some embodiments, shapes/graphics objects may be rendered graphically in the display area using the OpenGL API. Shape/graphics object models may be constructed using the basic objects of OpenGL such as, for example, points, lines, polygons. Other features of the OpenGL API may also be invoked such as, for example, geometric primitives for describing objects mathematically, coding the color of shapes/graphics objects, arranging and modeling objects in a 3D space, shading a shape/graphics object smoothly, tracking the z-coordinates of shapes/graphics objects, operating on pixels, transforming shapes/graphics objects (e.g., rotating the shapes/graphics objects), and selecting a shape/graphics object and/or a specific portion of the display area.

Figure 5:
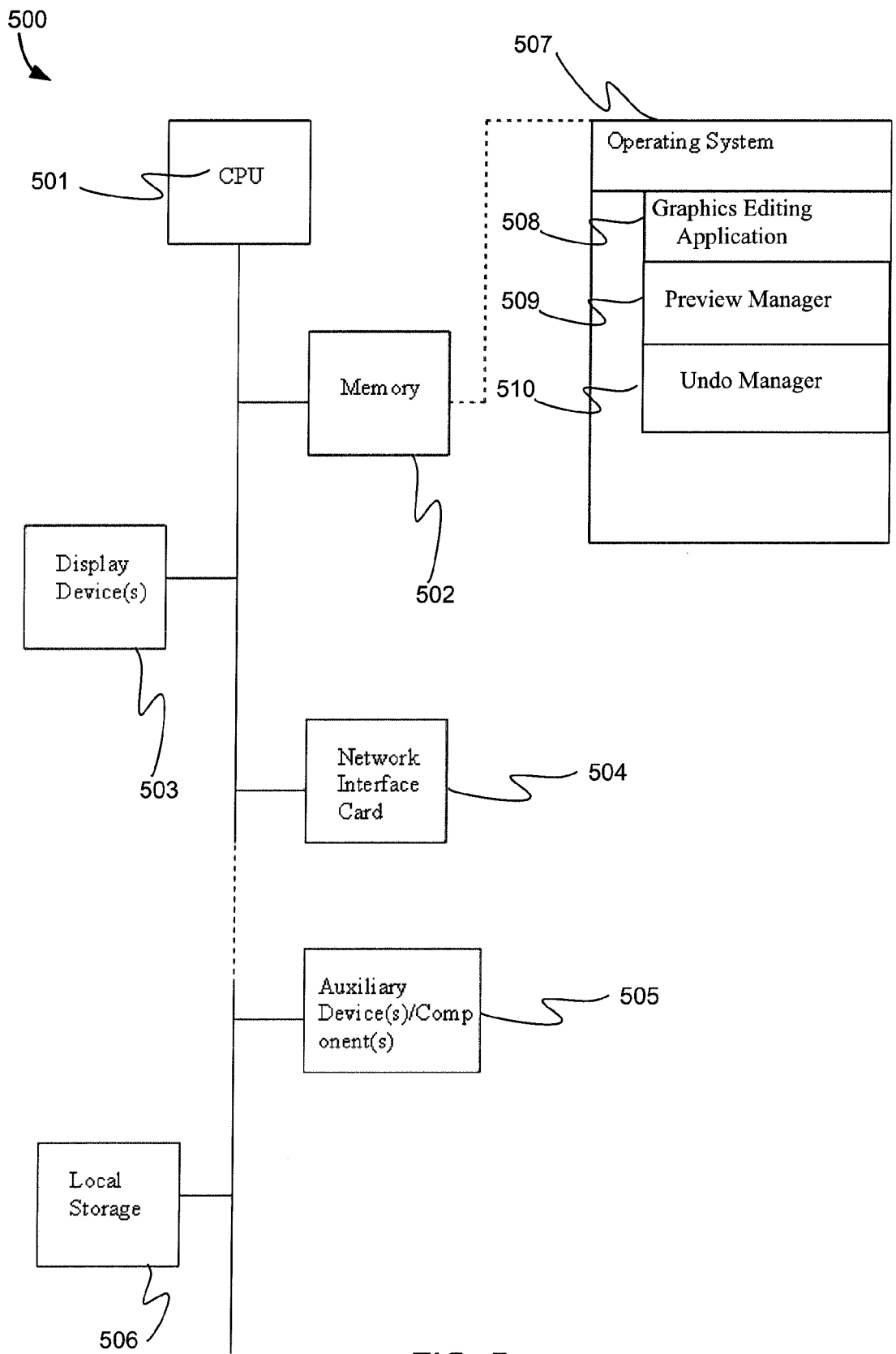
FIG. 5 illustrates an exemplary system block diagram of a system executing the graphics editing application in accordance with the present invention.

FIG. 5 illustrates an exemplary system block diagram of a system 500 executing graphics editing application 508, preview manager 509, and undo manager 510. The system may include a computer processing unit (CPU) 501, memory 502 (e.g., volatile or non-volatile), display device(s) 503, network interface card (NIC) 504, an interface for auxiliary device(s)/component(s) 505, and local storage 506 (e.g., non-volatile). An operating system 507 may reside in local storage 506, remotely on a network accessible by the NIC 504, and/or memory 502. Instructions being executed by the CPU 501 may be fetched from memory 502 and may include instructions from one or more modules of graphics editing application 508, preview manager 509, undo manager 510, and/or one or more other applications. The system 500 may be a handheld device, laptop computer, desktop computer, server, or some other system capable of housing the components 501-506.

Figure 6:
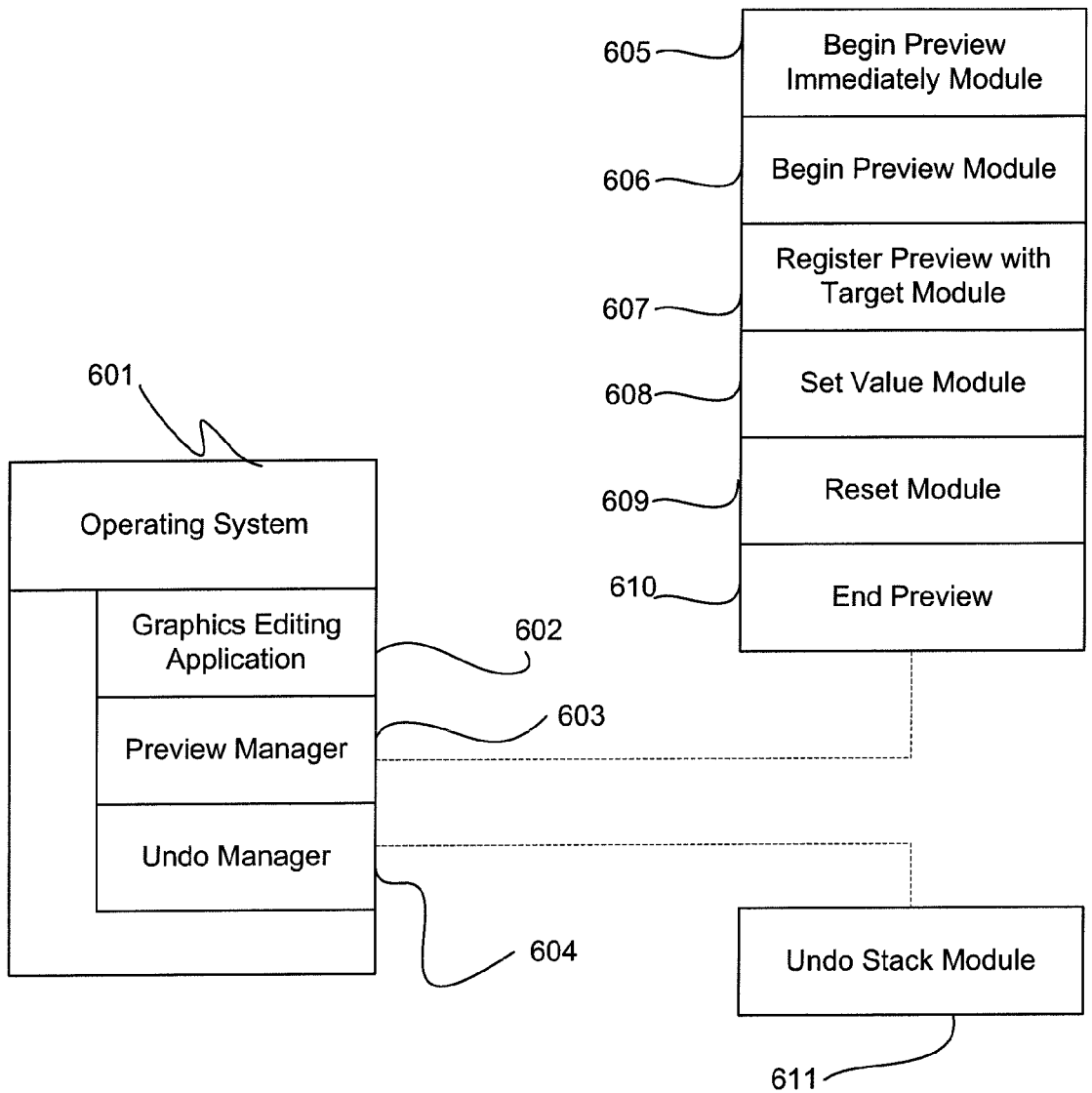
FIG. 6 illustrates an exemplary module block diagram of the execution of the modules/engines of the graphics editing application, preview manager, and/or undo manager in accordance with the present invention.

FIG. 6 illustrates an exemplary module block diagram of the execution of the modules/engines of the graphics editing application 602, preview manager 603, and/or undo manager 604 in accordance with the present invention. The preview manager 603 and undo manager 604 may be implemented as part of graphics editing application 602 or as separate programs or applications. The graphics editing application 602, preview manager 603, and/or undo manager 604 may be executed via an operating system 601 responsible for managing the system on which it is stored or configured to manage. The preview manager 603 and undo manager 604 may include one or more modules for executing the instructions corresponding to part of graphics editing application 301 and 401 for dynamic previewing of graphics objects. The modules of preview manager 603 may include a begin preview immediately module 605, a begin preview module 606, a register preview with target module 607, a set value module 608, a reset module 609, and an end preview module 610. The modules of undo manager 604 may include an undo stack 611. The preview manager 603 may also include an undo manager and undo stack separate from undo manager 604 and undo manager 611.

In an exemplary embodiment, graphics editing application including preview manager 603 leverages undo manager 604 to implement dynamic previewing of operations, such as undoable, redoable, and preview operations, by using undo stack module 611 to maintain operations necessary to restore the original state of a document or graphics object. In an exemplary embodiment, undo manager 604 may add operations that are being previewed to undo stack module 611 on a last in—first out (LIFO) basis. To undo an operation, undo stack module 611 is emptied in sequence to return the document or graphics object to its original state. In an exemplary embodiment, each preview changes the original state of the document or graphics object. In another exemplary embodiment, each preview may apply changes to the previous preview as opposed to the original state of the document or graphics object.

In an exemplary embodiment, preview manager, such as preview manager 603, is automatically turned on when graphics editing application 602 is launched and before any operation or preview of an operation is performed through the interface of graphics editing application 602. When a preview session is started, undo manager 604 begins an undo operation. In an exemplary embodiment, when an undo operation is started, any existing undo and redo states are stored separately by undo manager so that they are not affected by any preview operations. Upon a user hovering over a particular preview operation to be previewed (e.g., change the color of a graphics object), the state of the original document or graphics object is directly affected and changed to a preview state. When a user hovers over a second preview operation to be previewed (e.g., change to another color from a first color), a switch is made from the first preview state to a second preview state. Undo stack module 611 is used to unwind the first preview to prepare for the second preview. When the preview is ended without the user selecting an operation to be performed on the original document or graphics object, the undo operation is performed by the undo manager 604 to return the document to its original state or return the graphics object to its original state. In addition, if an undo and redo operation was stored by undo manager 604, the undo manager 604 may be restored to its original undo or redo state.

In an exemplary embodiment, when a preview operation is committed (i.e., the user selects an operation to be performed on the graphics object rather than just hovering over the operation to display a preview), the preview manager clears its undo manger's undo/redo stack and then modifies the document using the same operation that generated the preview. The modification is performed a second time to allow the document's regular undo manager to catch the modification as opposed to the temporary undo manager used by the preview manager. In addition, the undo stack of the preview manager's undo manager may be cleared if no preview operation is committed.

Figure 7:
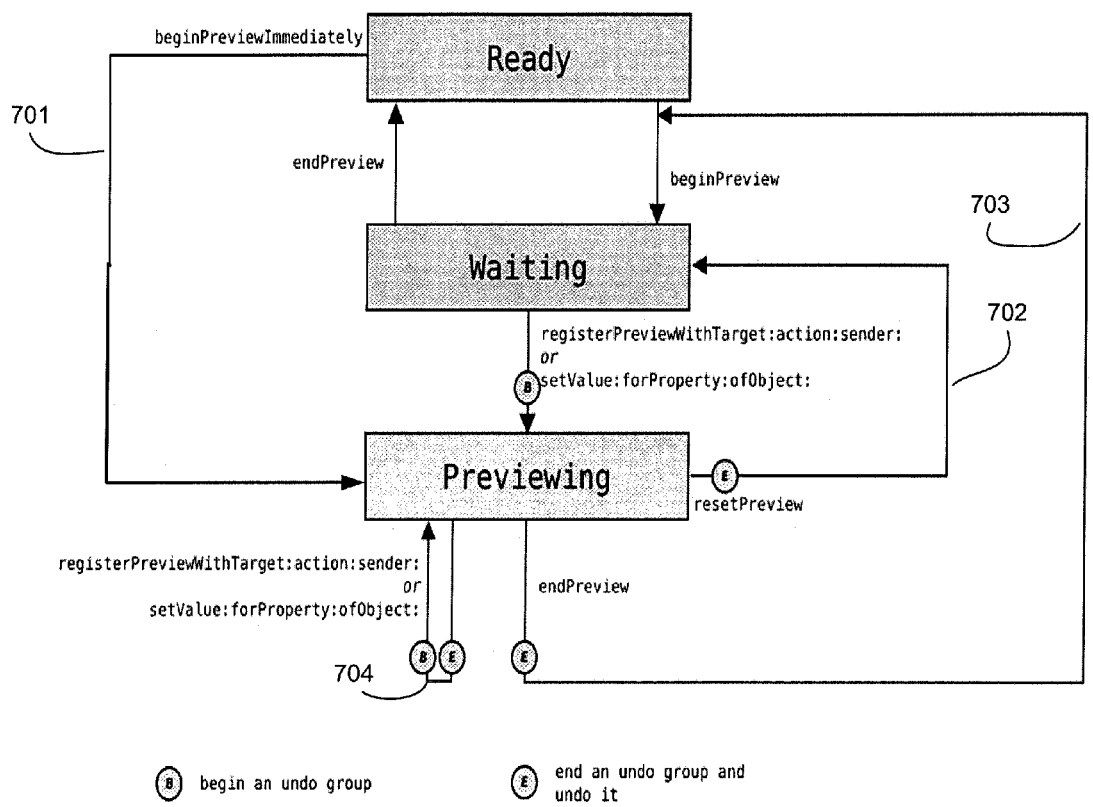
FIG. 7 illustrates an exemplary diagram of the preview manager in accordance with the present invention.

FIG. 7 illustrates an exemplary diagram of the preview manager 603 in accordance with the present invention. In an exemplary embodiment, preview manager 603 has three states—ready, waiting, and previewing—as illustrated in FIG. 7. Preview manager 603 may be in the ready state when graphics editing application 602 is launched and preview manager 603 begins a preview session. Begin preview immediate module 605 may be invoked (see 701), and preview manager 603 may be in a preview state. For example, a user may immediately hover over a shortcut icon to preview an operation (e.g., change line width of a graphics object) upon launching graphics editing application 602. The preview may then be ended when the end preview module 610 is invoked. For example, the user may choose not to apply the preview, and preview manager 603 returns to the ready state.

In an exemplary embodiment, preview manager 603 may transition from a ready state to a waiting state when it is waiting for an event to occur or an operation to be previewed or performed. For example, begin preview module 606 may be invoked, and preview manager 603 is in a waiting state. Preview manager 603 is waiting for a user to select an operation to be previewed on a graphics object. The state of the preview manager may change to a previewing state when the register preview with target module 607 or the set value 608 module are invoked. For example, a user may select an operation to be previewed. Undo manager 604 may utilize undo stack module 611 to add the operation to the undo stack and begin an undo group. Preview manager 603 may return to a waiting state if the reset preview module 609 is invoked (see 702). For example, if the user chooses not to apply a preview, the undo stack may be cleared of the preview operation by performing an undo operation. Preview manager 603 may also return to a ready state by invoking the end preview module 610 (see 703).

In an exemplary embodiment, a user may switch between previewing one operation and previewing a second operation on a graphics object or document. Preview manager 603 may remain in a previewing state. If the register preview with target module 607 or the set value 608 module are invoked, undo manager 604 may utilize undo stack module 611 to clear the operations in the undo stack and end the undo group (see 704). Further, undo manager 604 may utilize the undo stack to add the operation to the undo stack and begin an undo group. The second preview operation may then be applied to the graphics object or document.

Figure 8:
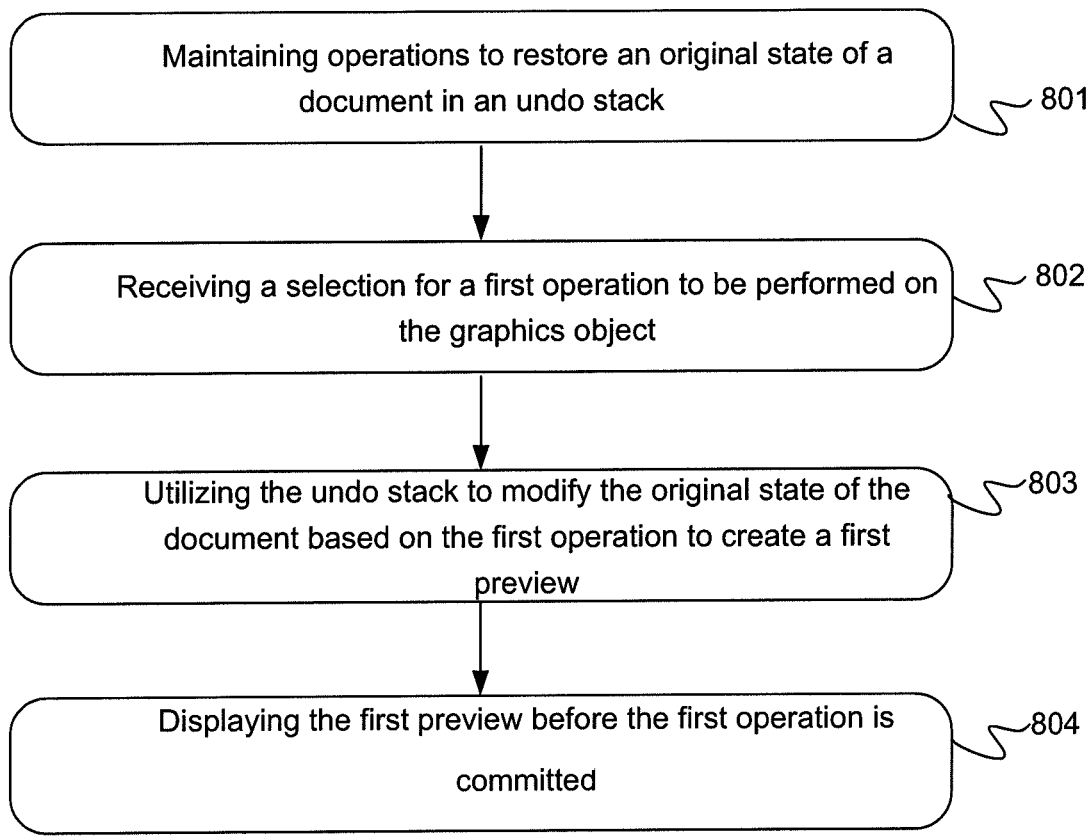
FIG. 8 illustrates an exemplary process flow in accordance with the present invention.

FIG. 8 illustrates an exemplary process flow in accordance with the present invention. At step 801, an undo stack, such as undo stack module 611, maintains operations to restore an original state of a document. The document may include a graphics object. At step 802, a computer, such system 500, may receive a selection for an operation to be performed on the graphics object. At step 803, the undo stack, such as undo stack module 611, may be utilized to modify the original state of the document based on the operation to create a preview. At step 804, a display device, such as display device 503, may display a preview in a display area before the operation is committed.

Figure 9:
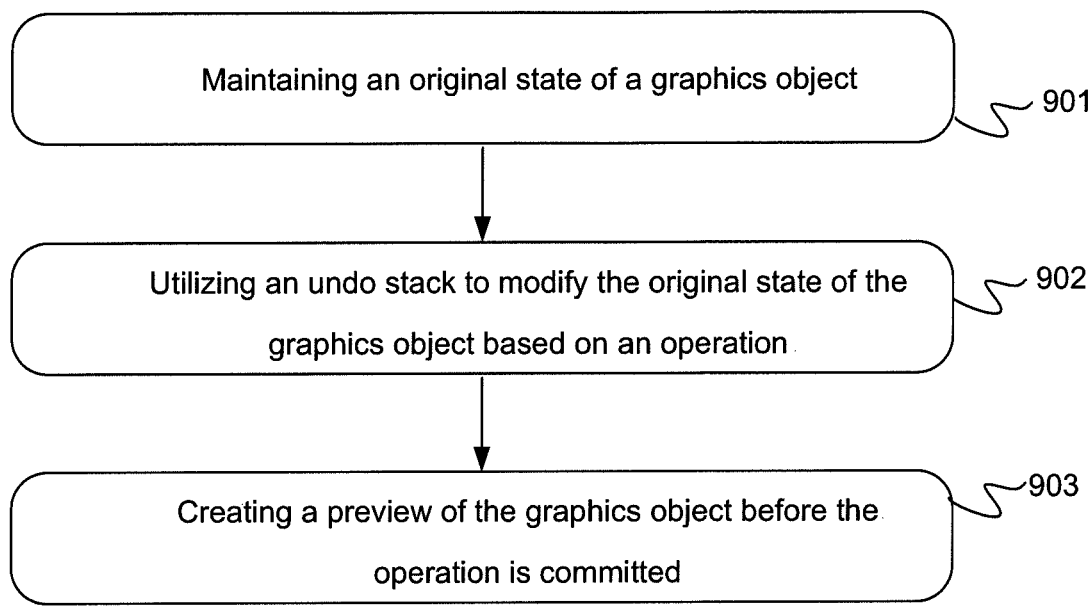
FIG. 9 illustrates an exemplary process flow in accordance with the present invention.

FIG. 9 illustrates an exemplary process flow in accordance with the present invention. At step 901, an undo stack, such as undo stack module 611, maintains an original state of a graphics object. At step 902, the undo stack, such as undo stack module 611, may be utilized to modify the original state of the graphics object based on an operation. At step 903, a preview of the graphics object may be created before the operation is committed.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

The invention claimed is:

1. A computer-implemented method, comprising: detecting a user movement input indicative of a possible selection of a first operation to be performed on at least one graphics object in a document, wherein the first operation is one of a plurality of selectable operations;

modifying an original state of the document based at least in part on the indication of the possible selection of the first operation to create a first preview of the first operation;

maintaining the first operation in an undo stack to restore the original state of the document, wherein the undo stack is configured to maintain the first operation to facilitate the first preview of the first operation;

displaying in a display area of a display device the first preview of the first operation before the first operation is selected; and removing the first operation from the undo stack when the first operation is selected to be performed.

2. The method of claim 1, comprising
performing the first operation;
modifying the original state of the document according to the first operation, the document including the at least one graphics object; and
displaying in the display area of the display device the first preview.

3. The method of claim 1, comprising:
displaying in the display area of the display device the document in its original state when the first operation is not selected to be performed.

4. The method of claim 1, comprising:
receiving an indication of a possible selection of a second operation;
adding the second operation to the undo stack;
unwinding the first preview and creating a second preview of the second operation; and
displaying in the display area of the display device the second preview before the second operation is selected to be performed.

5. The method of claim 4 comprising:
performing the second operation; and
modifying the original state of the document according to the performance of the second operation.

6. The method of claim 5, comprising:
performing the second operation for a second time, wherein the second operation is restored to the undo stack after the second performance of the second operation.

7. The computer-implemented method of claim 1, comprising storing the first operation onto another undo stack to restore the original state of the least one graphics object, wherein the other undo stack is configured to store the first operation to perform an undo operation when the first operation is selected to be performed.

8. The computer-implemented method of claim 1, comprising performing the first operation when the first operation is selected to be performed during a period of time following the first preview of the first operation to add the first operation to the undo stack for a second time, wherein adding the first operation to the undo stack for the second time comprises allowing an undo operation to return the document to the original state.

9. A system, comprising:
one or more processors;
memory;
a preview manager stored in the memory, wherein the preview manager is configured to receive a user movement input indicative of a possible selection of a first operation to be performed on at least one graphics object in an original state and to create a first preview of the first operation, wherein the first operation is one of a plurality of selectable operations;

an undo manager comprising an undo stack stored in the memory and communicatively coupled to the preview manager, wherein the undo manager is configured to store the original state of the at least one graphics object and the first operation onto an undo stack when the first preview of the first operation is possibly indicated, and to remove the first operation from the undo stack when the first operation is selected to be performed; and a display device configured to display the first preview of the first operation before the first operation is selected to be performed.

10. The system of claim 9, wherein the preview manager is configured to control the undo manager.

11. The system of claim 9, wherein the plurality of selectable operations comprises a change of line width of the at least one graphics object, a change of color to the at least one graphics object, an application of an effect to the at least one graphics object, a positioning of the at least one graphics object to a foremost portion or a rearmost portion of the display area, a layering of the at least one graphics object before or behind a second graphics object within the display area, or a combination thereof.

12. The system of claim 9, wherein the undo manager is further configured to perform the first operation and modify the original state of the at least one graphics object according to the first operation.

13. The system of claim 12, wherein the preview manager is further configured to communicate with the display device to display the first preview after the first operation is committed.

14. The system of claim 9, wherein the preview manager is further configured to communicate with the display device to display the at least one graphics object in its original state.

15. A computer-readable non-transitory storage medium storing one or more programs configured for execution by a computer, the one or more programs comprising instructions to:
detect a user movement input indicative of a possible selection of a first operation to be performed on at least one graphics object in a document, wherein the first operation is one of a plurality of selectable operations;
modify an original state of the document based at least in part on the indication of the possible selection of the first operation to create a first preview of the first operation;
maintain the first operation in an undo stack to restore the original state of the document, wherein the undo stack is configured to maintain the first operation to facilitate the first preview of the first operation;
display the first preview of the first operation before the first operation is selected; and
remove the first operation from the undo stack when the first operation is selected to be performed.

16. The computer-readable non-transitory storage medium of claim 15, wherein the one or more programs comprise instructions to:
change a line width of the at least one graphics object;
change a color of the at least one graphics object;
apply an effect to the at least one graphics object;
move the at least one graphics object to a foremost portion or a rearmost portion of the display area.

17. The computer-readable non-transitory storage medium of claim 15, wherein the one or more programs comprise instructions to:
perform the first operation;
modify the original state of the document according to the first operation, the document including the at least one graphics object; and
display the first preview of the first operation.

18. The computer-readable non-transitory storage medium of claim 15, wherein the one or more programs comprise instructions to:
receive an indication of a possible selection of a second operation;
add the second operation to the undo stack;
unwind the first preview and create a second preview of the second operation; and
display the second preview before the second operation is selected to be performed.

19. The computer-readable non-transitory storage medium of claim 18, wherein the one or more programs comprise instructions to:
perform the second operation;
modify the original state of the document based at least in part on the indication of the possible selection of the second operation; and
display in the display area the second preview of the second operation.

20. The computer-readable non-transitory storage medium of claim 19, wherein the one or more programs comprise instructions to:
perform the second operation for a second time, wherein the second operation is restored to the undo stack after the second performance of the second operation.

21. A method, comprising:
displaying via a display of an electronic device at least one graphics object;
modifying an original state of the at least one graphics object based at least in part on a received indication of a possible selection of one of a plurality of operations to be performed on the at least one graphics object;
displaying a first preview of a first operation to be performed on the at least one graphics object and a second preview of a second operation to be performed on the at least one graphics object, wherein the first preview is displayed before the first operation is selected and the second preview is displayed before the second operation selected;
maintaining the first operation and the second operation in an undo stack to restore the original state of the at least one graphics object, wherein the undo stack is configured to maintain the first operation and the second operation to facilitate the first preview of the first operation and the second preview of the second operation; and
removing the first operation and the second operation from the undo stack when the first operation or the second operation is selected to be performed.

22. The method of claim 21, wherein maintaining the first operation and the second operation in the undo stack comprises arranging the first operation and the second operation according to a last-in first-out (LIFO) data structure.

23. The method of claim 21, wherein displaying the first preview of the first operation and the second preview of the second operation comprises respectively operating in a first preview state and a second preview state, wherein, in the first preview state, the original state of the at least one graphics object is modified according to the first operation, and in the second preview state, the first preview of the first operation is modified according to the second operation.

24. A method, comprising:
displaying via a display of an electronic device at least one graphics object;
detecting a user movement input indicative of a possible selection of an operation to be performed on at least one graphics object, wherein the operation is one of a plurality of selectable operations;
modifying an original state of the least one graphics object based at least in part on the indication of the possible selection of the operation to create a preview of the operation;
storing the operation onto a first undo stack to restore the original state of the least one graphics object, wherein the first undo stack is configured to maintain the operation to facilitate the preview of the operation;
displaying via the display the preview of the operation before the operation is selected;
storing the operation onto a second undo stack to restore the original state of the least one graphics object, wherein the second undo stack is configured to store the operation to perform an undo operation when the operation is selected; and
removing the operation from the first undo stack when the operation is selected to be performed.

* * * * *